Aug. 9, 1966

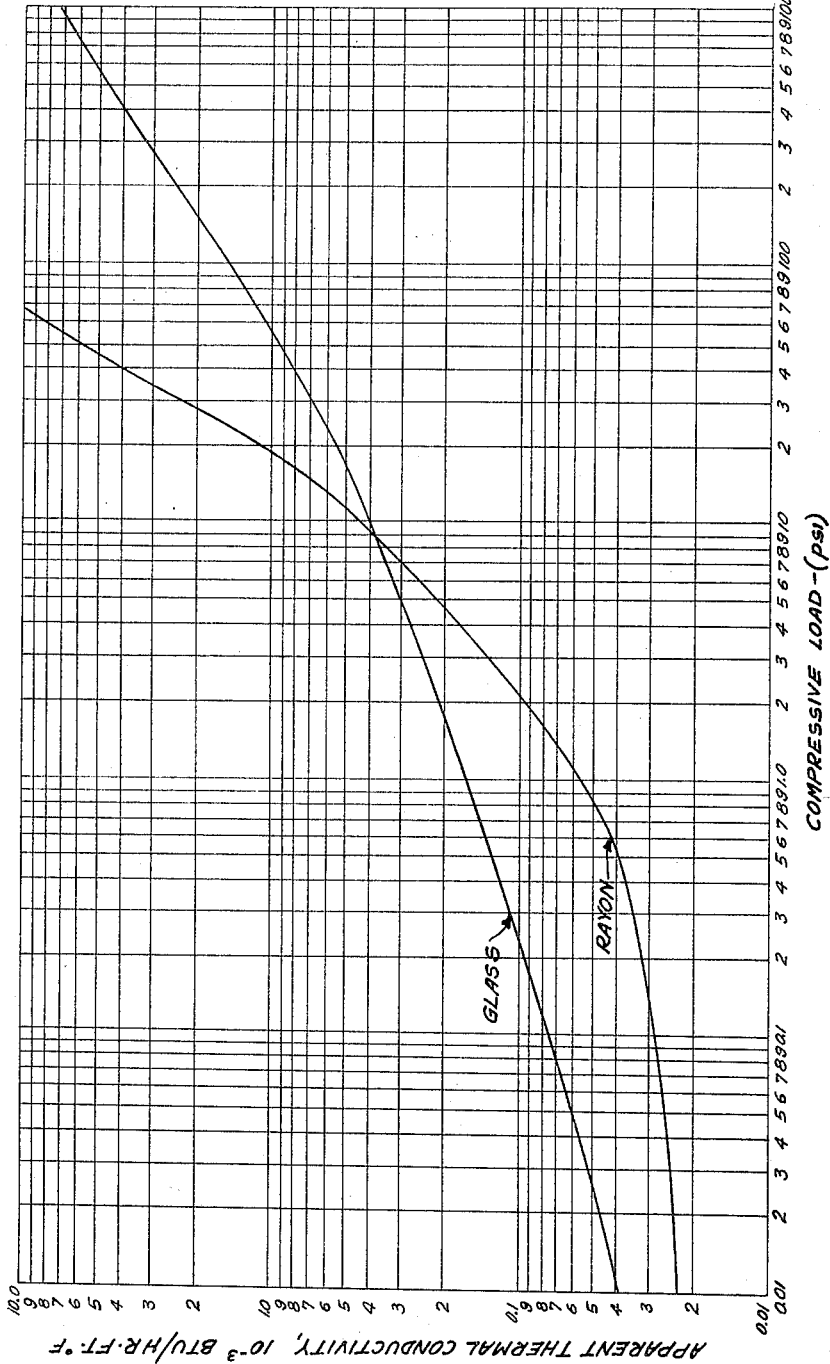

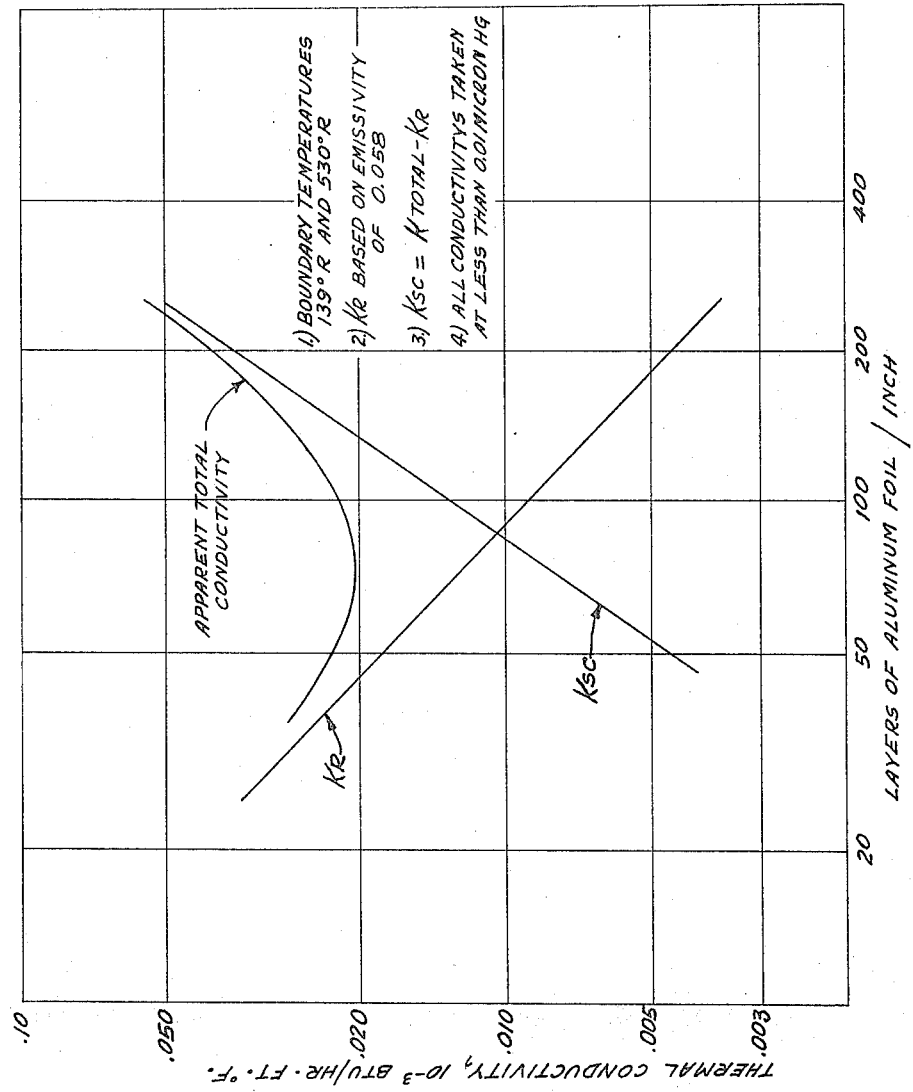

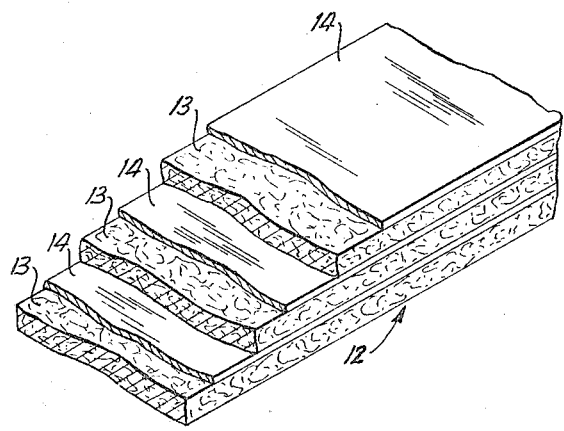
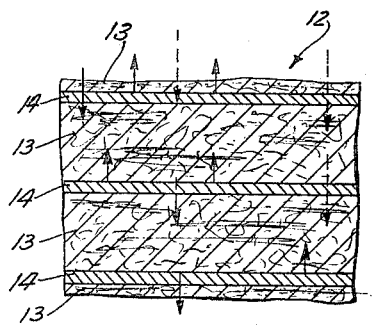
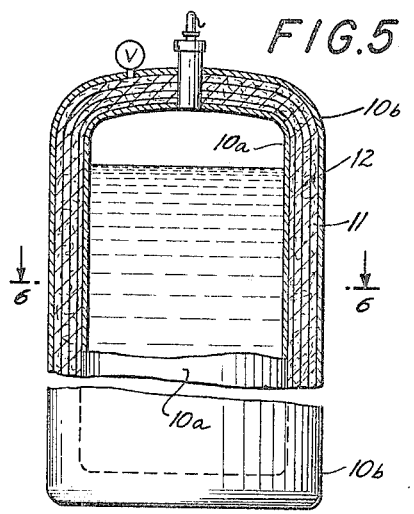
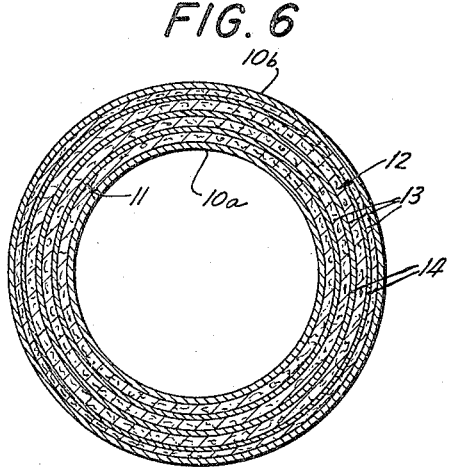
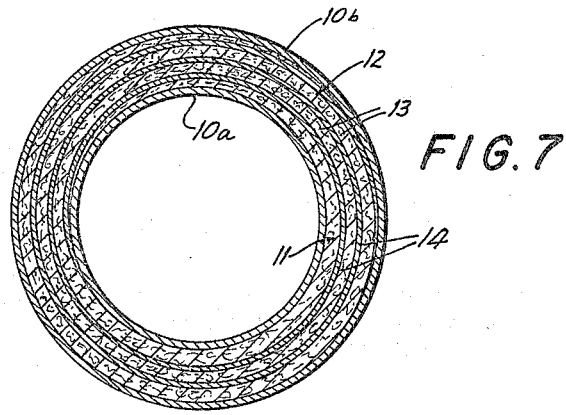

N. GIBBON ETAL 3,265,236

THERMAL INSULATION

Filed May 10, 1962

INVENTORS.
NORMAN GIBBON
JOHN A. PAIVANAS
BY DAVID I.J. WANG

*John C. LeFever*

ATTORNEY

United States Patent Office 3,265,236
Patented August 9, 1966

3,265,236
THERMAL INSULATION
Norman Gibbon, Tonawanda, John A. Paivanas, Williamsville, and David I-J. Wang, Buffalo, N.Y., assignors to Union Carbide Corporation, a corporation of New York
Filed May 10, 1962, Ser. No. 193,790
18 Claims (Cl. 220—9)

This invention relates to an improved insulation having a high resistance to all modes of heat transfer, and particularly concerns a low temperature, heat insulating material adapted to improve a vacuum insulating system.

In U.S. Patent No. 3,007,596, issued November 7, 1961, to L. C. Matsch there is described a composite multi-layered, external load-free insulation in a vacuum space. The insulation comprises low conductive fibrous sheet material layers composed of fibers for reducing heat transfer by gaseous conduction, and thin flexible sheet radiation barrier layers. The radiation barrier layers are supportably carried in superimposed relation by the fibrous sheet layers to provide a large number of radiation barrier layers in a limited space for reducing the transmission of radiant heat across the vacuum space without perceptively increasing the heat transmission by solid conduction thereacross. Each radiation barrier layer is disposed in contiguous relation on opposite sides with a layer of the fibrous sheet material, the fibers being oriented substantially parallel to the radiation barrier layers and substantially perpendicular to the direction of heat inleak across the insulating space. The fibrous sheet material is composed of fibers having diameters less than about 10 microns, the radiation barrier sheet has a thickness less than 0.2 mm., and the multi-layered composite insulation is disposed in the vacuum space to provide more than 4 radiation barrier layers per inch of composite insulation.

U.S. Patent No. 3,009,600, issued November 21, 1961, in the name of L. C. Matsch describes a preferred low conductive material for use in this multi-layered insulation, namely permanently precompacted paper composed of fibers having diameters less than 5 microns and a length of less than 0.5 inch. The paper is preferably formed of glass fibers.

The first-mentioned patent, incorporated herein by reference to the extent pertinent, described various materials suitable for employment as the low conductive fibrous component and the radiation barrier component, with particular emphasis on low temperature systems, as for example, between liquid oxygen and ambient temperature boundaries. The preferred materials for cryogenic insulations include glass fiber sheets and aluminum or copper foils.

One problem which has arisen in the use of this composite multi-layered insulation is that the thermal conductivity of glass fiber increases markedly when held under compression. Some degree of interlayer compression is necessary to hold the composite insulation in position, and provide stability when the vacuum space is exposed to movement.

One object of the present invention is to provide an improved composite multi-layered insulation system in a vacuum space, the efficiency of which is not seriously reduced when exposed to compressive loads.

Another object is to provide an improved composite multi-layered insulation system in a vacuum space, having layers of low conductive fibrous sheet material whose thermal conductivity is not greatly increased by compressive loads.

Further objects and advantages of this invention will be apparent from the ensuing disclosure and the appended claims.

In the drawings:

FIG. 1 is a graph showing the thermal conductivity-compression load relationship for rayon-aluminum foil insulations and the conventional glass fiber-aluminum foil insulation;

FIG. 2 is a graph showing the overall thermal performance of the rayon-aluminum foil insulation of the present invention;

FIG. 3 is an isometric view of the composite insulating material of the invention shown in a flattened position with parts broken away to expose underlying layers;

FIG. 4 is a greatly enlarged detail sectional view showing the irregular path of heat transfer through the composite insulating material of the invention.

FIG. 5 is a front elevational view, partly in section, of a double-walled liquid container employing the principles of the invention;

FIG. 6 is a sectional view taken along line 6—6 of FIG. 5 illustrating the concentric wrapping of insulating material of the invention;

FIG. 7 is a sectional view similar to FIG. 6 illustrating the spiral wrapping of insulating material of the invention;

Figure 8:
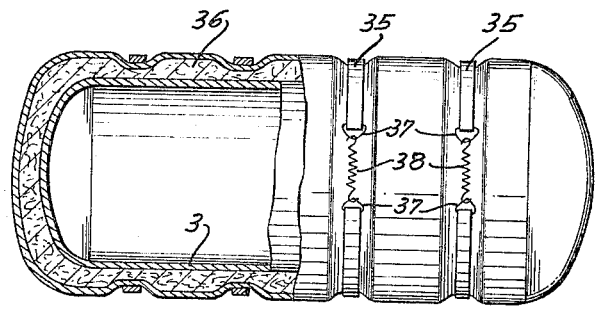
FIG. 8 is a longitudinal elevation view taken partly in cross-section of another double-walled container employing external tension straps for localized compression.

One embodiment of the invention contemplates apparatus provided with a vacuum space. A composite multi-layered insulation is provided in the space comprising low conductive organic fibrous sheet material layers composed of fibers and thin flexible sheet radiation barriers. The latter are supportably carried in superimposed relation by the organic fibrous sheet layers to provide a large number of radiation barrier layers in a limited space for reducing the transmission of radiant heat across the vacuum space without perceptively increasing the heat transmission by solid conduction. Each radiation barrier layer is disposed in contiguous relation on opposite sides with a layer of the organic fibrous sheet material. Also, the fibers of the organic fibrous sheet material are oriented substantially perpendicular to the direction of heat transfer across the insulating space. The organic sheet material is composed of fibers having an intrinsic conductivity of less than 0.25 B.t.u./hr. sq. ft. ° F./ft., and a modulus of elasticity of at least $0.35 \times 10^6$ lb./sq. in. The organic fibers also have diameters less than 20 microns, and at least a portion of the organic fibrous sheet is under a compressive load of 0.01 to 9 p.s.i.

The radiation barrier sheet has a thickness less than 0.2 mm. Shields of greater thickness, if provided in sufficient numbers for effective reduction of radiation, will produce such a heavy, dense insulation as to render proper support of the fiber sheets very difficult. Furthermore, thicker shields reduce the flexibility of the insulation so that it is difficult to apply. The multi-layered composite insulation is disposed in the insulation space to provide more than 5 radiation barrier layers per inch of composite. A lesser number of radiation barriers does not effectively impede heat transfer by radiation.

It has been unexpectedly discovered that organic fibrous materials having certain physical and thermal characteristics, afford remarkably improved results when employed as the low conductive component of multi-layered composite insulation.

As used herein, the expression "intrinsic conductivity" refers to the solid thermal conductance of the base material composing the fibers. Many organic solids have lower intrinsic conductivity than glass, and are therefore potentially attractive materials for radiation barrier separators.

A review of the mechanism of heat transfer through oriented fiber sheets will show why low intrinsic conductivity is benficial. The heat flow path is laterally along individual fibers, and then across fiber-to-fiber contact points to fibers at lower temperature levels. A substantial part of the resistance is through the fiber length, and a change in the intrinsic conductivity of the fiber material will therefore have an important effect on the overall heat transport. Table I lists the approximate intrinsic conductivities of various organic fibers and the ratio to the corresponding value for glass fiber.

*Table I*

| Material | Intrinsic Conductivity, $K_i$=B.t.u./hr. ft.$^2$ °F./ft. | Ratio: $K_i$ (glass)/$K_i$ (organic) |
|---|---|---|
| Glass__g | .485 | |
| Rayon (Viscose) | .1285–.21 | 3.77–2.31 |
| Teflon (tetrafluoroethylene) | .142–.145 | 3.41–3.34 |
| Saran (vinylidenechloride) | .053–.085 | 9.15–5.6 |
| Dynel (vinyl chloride-acrylonitrile copolymer) | .0775 | 6.25 |
| Nylon (polyamide) | .111–.145 | 4.36–3.34 |
| Dacron (condensation of dimethyl terephthalate and ethylene glycol) | .0875 | 5.55 |
| Cotton (cellulose with about 7% moisture) | .07 | 6.93 |

An inspection of this data will reveal that the listed organic materials have between 2.31 and 9.15 times lower conductivity than glass fiber. One might conclude that any of these materials would afford improved results over the glass fiber form of low conductive component for multi-layer insulation, but be have found otherwise.

Referring now to FIG. 1, the relationship between apparent thermal conductivity and compressive load is shown for rayon-aluminum foil and glass-aluminum foil multi-layer insulations. Neglecting gaseous conduction, apparent thermal conductivity is the sum of the solid conductance $k_{sc}$, and the radiation component, $k_r$. Solid conductance in turn varies directly with intrinsic conductivity to the first power and also varies in a complex inverse manner with the modulus of elasticity, so that high intrinsic conductivity results in larger apparent thermal conductivities. The boundary temperatures for FIG. 1 are 530° R. and 60° R., and the pressure is less than 0.1 micron Hg. Physical characteristics of the two insulations are tabulated below for comparison.

| Property | Glass-Foil | Rayon-Foil |
|---|---|---|
| Fiber diameter | 0.5–0.75μ | 12μ |
| Fiber sheet weight_____gm./ft.$^2$ | 1.6 | 1.475 |
| Aluminum foil thickness_____in | .00025 | .00025 |
| Aluminum foil emissivity | .058 | .058 |
| $K_{(min.)}$ B.t.u./hr. × ft.$^2$ | .021×10$^{-3}$ | .020×10$^{-3}$ |
| Layers/in. at $K_{(min.)}$ | 60 | 75 |
| Density at $K_{(min.)}$_____lb./ft.$^3$ | 5.5 | 6.1 |
| Cost $/ft.$^3$ | 15.0 | 7.4 |
| C × $K_{(min.)}$ | 0.31×10$^{-3}$ | 0.15×10$^{-3}$ |

The rayon used in the FIG. 1 tests is a non-woven, dull type made by the viscose process. It contains ½ to 1% by weight titanium dioxide; and organic binder, polyvinylacetate, is also applied to the sheet by the manufacturer in wavy or serpentine bands spaced across the sheet width. This is to improve the strength and handling characteristics of the thin material. The resultant sheet weighs about 1.475 gms. per sq. ft. of which 14% is binder, and in appearance has a large percent of essentially open area. Comparing the two insulations, it is seen that the rayon obtains a minimum thermal conductivity equal to the glass, but with fibers 16 to 24 times larger.

Another viscose rayon paper was tested consisting of fibers approximately equal in size to the material described above, but prepared in much thinner sheets. This was also a non-woven material, uniform in structure and weighing 1.01 gm./ft.$^2$. An insulation composed of the rayon paper alternating with .00025-inch thick aluminum foil gave the following apparent conductivities between ambient and liquid nitrogen temperatures:

Layers/inch:                $K_a$, G.t.u./hr. ft.$^2$ °F./ft.
212 _____ .0286×10$^{-3}$
251 _____ .0248×10$^{-3}$ Referring again to FIG 1, it will be noted that an impressively lower thermal conductivity is obtained with the rayon-aluminum foil composite insulation for compressive loads usually encountered in service, 0.01 to 9 p.s.i. The largest spread between the curves occurs at compressive loads of 0.3–0.5 p.s.i. The advantage diminishes at loads above 1 p.s.i. and finally disappears at 9 p.s.i. At still higher compression, the thermal conductance of the rayon composite insulation is greater than the glass fiber insulation, and the organic material becomes increasingly sensitive to compression. The reason for this crossover of the two insulation curves is believed to be the relatively low modulus of elasticity of organic fibers as compared to glass. At high compression, the cross-contact points between the organic fibers are depressed and deformed, thereby reducing the heat flow resistance from fiber to fiber. Unless the intrinsic condutcivity of the organic fibrous material is less than 0.25 B.t.u./hr. sq. ft. °F./ft., the apparent thermal conductivity under zero load conditions will be sufficiently high so that the compresison load curve is completely above the corresponding curve for glass fiber (see FIG. 1). Such organic fibers would not afford any great advantage over glass fiber, and do not constitute part of the present invention.

Another critical feature of the present invention is the modulus of elasticity of the organic fiber material, sometimes referred to as Young's modulus (Y)

$$Y = \frac{\text{tensile stress}}{\text{tensile stain}} = \frac{\text{compressive stess}}{\text{compressive strin}}$$

$$Y = \frac{Fn/A}{\Delta l/lo}$$

where $Fn$=force applied to fiber
$A$=a cross-sectional area to which the force is applied
$lo$=original length of fiber
$\Delta l$=change in length of fiber As previously indicated, the modulus of elasticity for organic fibers is lower than that of glass fiber. This is a disadvantage because the fibers bend and flex more easily and the contact areas between adjacent fibers increase considerably under compressive loads, thereby improving the path for heat transfer by solid conduction. It has been found that organic fibrous materials having a modulus of elasticity of at least 0.35×10$^6$ lb./sq. in. may be used in the present invention when the compressive load is below about 2 p.s.i. Substantially greater advantages exist for organic fibers having a modulus of elasticity of at least 1×10$^6$ lb./sq. in., as for example rayon and cotton. The modulus of elasticity values for the same materials listed in Table I are listed below in Table II.

Table II

| Material: | Modulus of elasticity, lb./in.$^2$ |
|---|---|
| Glass | $10 \times 10^6$ |
| Rayon, viscose (molecules unoriented) | $0.93–1.81 \times 10^6$ |
| Rayon, viscose (molecules highly oriented) | $2.5–3.4 \times 10^6$ |
| Teflon | $0.58 \times 10^6$ |
| Saran | $0.04–0.246 \times 10^6$ |
| Dynel | $0.2–0.595 \times 10^6$ |
| Nylon | $0.17–0.45 \times 10^6$ |
| Dacron | $0.375 \times 10^6$ |
| Cotton | $1.015–1.16 \times 10^6$ |

It will be apparent from an inspection of Table II that based on modulus of elasticity values, rayon, Dynel, nylon, Dacron, cotton, Dacron and certain types of Dynel and nylon are suitable for use as the low conductive organic fiber material of this invention. The preferred materials are rayon and cotton.

As used herein, the term "rayon" refers to synthetic organic fibers composed of regenerated cellulose. Although the specific rayon samples used in the previously described experiments were prepared by the so-called viscose process, rayon prepared by the cellulose acetate or cuprammonium process could also be employed providing the fibers meet the previously described limitations of diameter, orientation, intrinsic conductivity, and modulus of elasticity. Although each of these rayon synthesis processes is quite different as far as details of procedure are concerned, they all follow the same general outline: solution of the cellulose through a chemical reaction, aging or ripening of the solution (peculiar to viscose), filtration and removal of air (spinning of the fiber), combining the filaments into yarn, purifying the yarn (not necessary for acetate), and finishing (bleaching, washing, oiling and drying). The general reactions are as follows, the well-known synthesis being more completely described in "Chemical Process Industries," by R. Norris Shreve, pages 724–733 (1945).

Viscose:

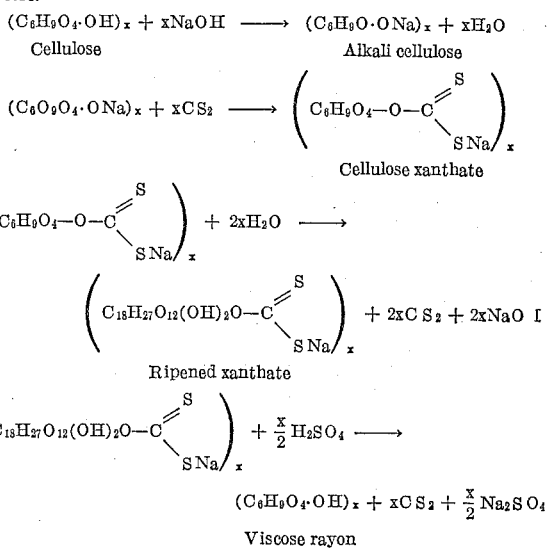

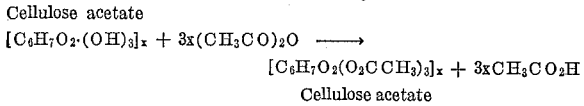

Cuprammonium:

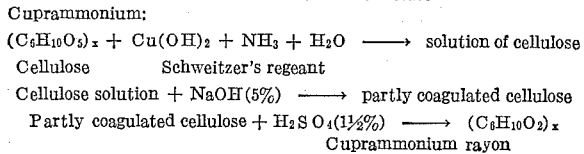

Cotton is a naturally occurring cellulosic material whose properties may vary depending upon the type and grade. Obviously, some selection must be exercised so that the material will have the necessary characteristics and properties as defined herein. In preparation for use, the cotton should preferably be washed free of oily substances.

"Dacron" is a synthetic fiber made by the condensation of dimethyl terephthalate and ethylene glycol, and is manufactured and sold by E. I. du Pont de Nemours and Company.

"Dynel" is a synthetic fiber made by the copolymerization of 40% acrylonitrile and 60% vinyl chloride, and is manufactured and sold by Union Carbide Corporation.

"Nylon" is the generic term for a series of polyamide resins made by the polymerization of a hexamethylenediamine salt of adipic acid.

The organic fibers may be composed into thin precompacted sheets using either papermaking or textile machinery. In either case, the fibers are laid down on a moving screen and are compressed while wet as between rolls, so that after drying, the paper retains a compressed condition. A small amount of binder may be used in the paper to improve its strength and to obtain thinner sheets.

It should be recognized that although Table II indicates that Teflon and Saran are not suitable for employment in the present invention due to low modulus of elasticity, future technological improvements in the synthesis of any of all of these or other organic fibers may establish their applicability, providing the various defined criticalities are satisfied.

FIG. 2 shows the additive contributions of radiation $k_r$ and solid conduction $k_{sc}$ to the apparent thermal conductivity of rayon-aluminum foil composite insulation having various degrees of tightness. The boundary temperatures are 139° R. and 530° R., and the parameters for this specific insulation are the same as previously listed for comparison with glass paper-aluminum foil. It can be readily seen that as the number of aluminum foil layers per inch is increased, radiation heat transfer is decreased while heat transfer by solid conduction is increased. The thermal conductivity of the composite insulation is the sum of radiation and solid conduction only, in view of the vacuum pressure which essentially eliminates gaseous conduction. As the number of aluminum foil layers per inch is increased, the overall thermal conductivity decreases to a minimum value and then rises as the effect of solid conduction becomes more important. Any composite multi-layered insulation of low conductive organic fibrous sheets and radiation barrier layers has performance curves of the same general relationship. For this particular composite insulation, the minimum apparent thermal conductivity occurs at about 87 aluminum foil layers per inch, and for any insulation constructed in accordance with the present invention, best results from the standpoint of minimum thermal conductivity are obtained with between 40 and 165 radiation barrier layers per inch.

As a feature of the invention, the low conductive organic fibrous sheet of separating material to be used in the present vacuum-solid insulating system should be fabricated in such manner that its fibers are, for all intents and purposes, randomly disposed within the plane of the separating sheet, and oriented in a direction substantially perpendicular to the flow of heat. It will be understood that as a practical matter, the fibers will not be individually confined to a single plane, but rather, in a finite thickness of fibrous material, the fibers will be generally disposed in thin parallel strata with, of course, some indiscriminate cross weaving of fibers across the various strata.

The principal reasons for the far superior insulating effects achieved by such a fiber orientation are believed to be the relatively few fibers traversing the thickness of the insulating sheet and the point contacts established between crossing fibers. These point contacts represent the points of joinder between adjacent fibers in the direction of heat flow, and as such, constitute an extremely high resistance to the flow of heat by conduction. In this fashion it is possible to achieve in a finite thickness of insulating material, an extremely high degree of conductive resistance between proximate sheets of radiation barrier. Best results have been obtained when the fiber diameter is less than 15 microns, although larger diameter fibers up to 20 microns, depending upon the insulation thickness employed, still produce superior results.

The sequence of modes of heat transfer which might occur in a typical multi-layer insulation of radiation barriers, e.g., aluminum foil sheets which are proximately spaced from each other by sheetings of low-conductive organic fibers, e.g., rayon having a fiber orientation substantially parallel to the aluminum foil sheets and transverse to the direction of heat flow, might be as follows:

Referring to FIG. 4, radiant heat striking the first sheet of aluminum foil will for the most part be reflected, and the remaining part absorbed. Part of this absorbed radiation will tend to travel toward the next barrier by re-radiation, where again it will be mostly reflected, part will travel by solid conduction, and a minor part by conduction through the residual gas. According to the solid conduction method of heat transfer, the heat leak proceeds along the rayon fibers in what might be considered an irregular path, crossing relatively small areas of point contact between crossing fibers until it reaches the second sheet of aluminum foil where the heat reflecting and absorbing process described above is repeated. Because of the particular orientation of the rayon fibers, the path of solid conduction from the first sheet of aluminum foil to the second is greatly lengthened, and encompasses an extremely large number of point contact resistances between contacting fibers. By analogy it will be seen that a multi-layer insulation having a series of heat reflecting sheets and a fiber oriented sheet of low conductive organic insulating material therebetween may be particularly efficient in preventing or diminishing heat losses by radiation, as well as by conduction.

One of the important advantages in the thermal insulation of the present invention is that the flexibility of the layers of radiation sheeting and low conductive organic fibrous sheeting allows the insulation thickness as a whole to be pliably bent so as to conform to irregularities and changes in the surface conditions of the container to be insulated. The composite material of the invention is adapted to be applied to contoured surfaces, and is particularly well suited for insulating either flat or cylindrical surfaces.

Shown in FIG. 5 is a double-walled heat insulating vessel having parallel inner and outer container walls 10a and 10b and an evacuated insulating space 11 therebetween. Disposed within the insulation space 11 is a composite insulation material 12 embodying the principles of the invention, and comprising essentially a low heat conductive organic fibrous material 13 having incorporated therein multiple reflective shields or radiation barriers 14 for diminishing the transfer of heat by radiation across the insulating space 11. In assembly, the insulation may occupy the entire insulating space 11, and appears as a series of spaced reflectors 14 disposed substantially transversely to direction of heat flow and supportably carried by the solid, low conductive insulating material. The organic insulating material contacts and supports the entire surface of each radiation shield and, in addition to its primary purpose of serving as an insulating material, constitutes a carrier and spacing material for maintaining a separation spaced between adjacent shields.

The multiple layer insulation of the invention may be mounted in the insulation space in any one of a variety of ways. For example, in FIG. 6, the insulation 12 is mounted concentrically with respect to an inner container 10a, or it may be, as in FIG. 7 spirally wrapped around the inner container with one end of the insulation wrapping in contact with the inner container 10a, and the other end nearest an outer container 10b or in actual contact therewith, the latter form of mounting being preferred and illustrated herein. Referring to FIG. 7, the radiation sheeting may be loosely spirally wrapped around the inner container 10a, the tightness and number of turns being varied to suit the particular conditions or the requirements desired. By providing a large number of turns of insulation wrappings, the passage of radiative heat is substantially eliminated, while the conductive heat flow along the spiral path is effectively reduced owing to the lengthened heat path.

It is to be understood that the present insulation is equally suitable for use in vacuum spaces bounded by flat surfaces.

As previously discussed, at least a portion of the organic fibrous sheet is under a compressive load of 0.01 to 9 p.s.i. in order to impart stability, and to provide the desired number of radiation barriers per inch of insulation. The entire surface area of this material may be subjected to such load as for example illustrated in FIGS. 6 and 7, but in a preferred embodiment means are provided for concentrating the total frictional force in a minor part of the total insulated area whereby such minor part is above its stable density and the remaining major part is maintained below its stable density. As used herein, the phrase "stable density" refers to the insulation density to which the entire composite insulation body would have to be compressed uniformly in order to achieve mechanical stability without use of the frictional force concentrating means, under the expected conditions of handling and service of the insulated apparatus.

Referring now to FIG. 8, the means for concentrating the total frictional force in this manner may, for example, comprise multiple tension bands 35 extending laterally around the outer surface of the composite multi-layer insulation 12 having previously been wrapped around container 13. Bands 35 are spaced longitudinally along container 13 in contiguous association with a minor part of the insulation surface, and under sufficient tension to maintain such part above its stable density.

Ordinary steel strip material, as used by the packaging industry, is usually suitable as bands 35 for either cryogenic or high temperature service, since the insulation protects the bands from extreme thermal conditions. A suitable retaining means such as clips 37 may be provided with a tension spring 38 so as to maintain approximately constant predetermined compression regardless of thermal contraction or expansion of the inner vessel. A degree of band elasticity is especially desirable for cryogenic vessels since thermal contraction of the container tends to relax the insulation compression and results in some loss of stability.

Figure 9:
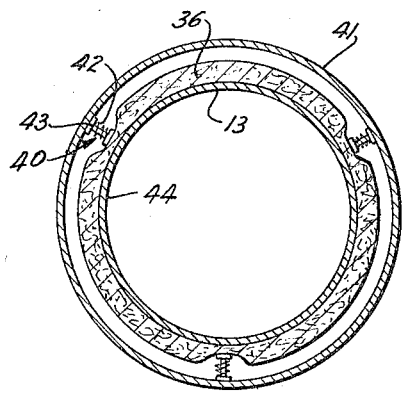
FIG. 9 is an end view of a modified double-walled container using compression members for localized compression.

Means other than banding are suitable for applying localized compression to a minor part of the instant, multiple-layer insulation so as to maintain the minor part above its stable density. As shown in FIG. 9, compression members 40 may be constructed and arranged between the inner walls of the outer casing 41 and the outer surface of the composite insulating material 36. The compression members 40 may, for example, comprise center post sleeve 41, spring 42, and retainers 43 at opposite ends of the spring. Any desired member of compression members, e.g., three, may be located in the same vertical plane at uniform intervals around the periphery of the container. Also, the compression members 40 may be spaced at any desired intervals along the longitudinal axis of the container.

Figure 10:
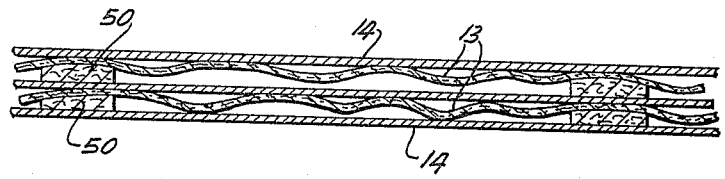
FIG. 10 is an enlarged view, taken in cross-section, of a composite insulation construction employing bulking means for localized compression.

Still another means for applying localized compression to a minor part of the present composite insulation is illustrated in FIG. 10, namely low heat conductive compressible bulking material 50 between at least some of the fibrous sheet layers 13. The bulking component may, for example, be in the form of organic fibrous strips, e.g., rayon or cotton, each extending laterally around an inner vessel and spaced longitudinally along such vessel in lateral rows of increasing diameter.

At least a portion of the bulking component provided under any given layer should be aligned over and in registry with bulking component provided under previously applied layers. Viewing the multiple-layer insulation in cross section, the bulking component preferably produces a relatively dense "column" structure through the insulation thickness. This column preferentially supports the layers and transits the interlayer compression to the supporting wall. Areas between the "columns" are at very low density, and may actually be less dense than the self-supporting density.

Referring again to FIG. 1, it will be seen that glass fibrous materials subjected to appreciable compression under the stabilizing devices will cause a marked increase in heat transport through the insulation system. However, if the major portion of the fiber under compression is an organic material of this invention, then the adverse effect of stabilizing the insulation will be much reduced. Thus, in the embodiment of FIG. 10, the compressed bulking component 50 is advantageously composed of rayon or cotton fibers. The continuous fibrous sheets 13 may also be composed of organic fibers, or alternatively they may now be selected of any desired fiber material since they are freed of compression by the bulking component. One preferred use of this invention is in an insulation as shown in FIG. 10 wherein the continuous sheets 13 are composed of glass fibers while the bulking material is rayon or cotton. The use of glass for sheets 13 is advantageous because the insulation space can be more rapidly evacuated.

More specifically, one embodiment of this invention contemplates an apparatus such as that illustrated in FIG. 5 provided with a gas evacuated insulating space 11 contiguously associated with a heat transferable container 10a and being enclosed by rigid self-supporting walls 10b. In the insulating space 11, a heat insulative and radiation-impervious composite flexible material comprising a multiplicity of thin, flexible, radiant heat barrier layers 14 of thickness less than about 0.2 mm. are disposed in spaced relation to each other for reducing the transmission of radiant heat across the space (see FIG. 10). Barrier layers 14 are preferably the previously described aluminum foil material. A multiplicity of low heat conductive fibrous sheet material layers 13 composed of fibers having diameters less than about 15 microns are coextensive with the radiant heat barrier layers 14 and disposed in contiguous adjacency between and in alternating sequence therewith. The low conductive layers 13 preferably in the form of the previously described precompacted paper composed of glass fibers are also contiguously associated with the heat transferable container 10a for separating and supporting the barriers 14 spaced from each other. The radiant heat barrier-low heat conductive fibrous layer composite insulating material is assembled sufficiently closely to provide at least 4 fibrous sheet layers per inch of composite insulation. Low heat conductive bulking material layers 50 in the form of the previously defined organic fibers, are provided between at least some of the fibrous sheet material layers. The bulking materials layers 50 have a total surface area contiguously associated with a minor part of the surface area of the fibrous sheet material layers, adjacent organic bulking material layers across the insulating space being at least partially aligned with each other.

Although preferred embodiments of the invention have been described in detail, it is to be understood that modifications and variations may be effected without departing from the point and scope of the invention.

What is claimed is:

1. In an apparatus provided with a vacuum space, a composite multi-layer insulation in said space comprising low conductive organic fibrous sheet material layers composed of fibers for reducing heat transfer by solid conduction and thin, flexible sheet radiation barrier layers, said radiation barrier layers being supportably carried in superposed relation by said organic fibrous sheet layers to provide a larger number of radiation barrier layers in a limited space for reducing the transmission of radiant heat across said space without perceptively increasing the heat transmission by solid conduction thereacross, each radiation barrier layer being disposed in contiguous relation on opposite sides with a layer of the organic fibrous sheet material, the fibers of said fibrous sheet material being oriented substantially parallel to the radiation barrier layers and substantially perpendicular to the direction of heat transfer across the insulating space, said organic fibrous sheet material being composed of fibres having an intrinsic thermal conductivity of less than 0.25 B.t.u./hr. sq. ft. ° F./ft., modulus of elasticity of at least $0.35 \times 10^6$ lb./sq. in., and having diameters less than 20 microns, at least a portion of the organic fibrous sheet being under a compressive load of 0.01 to 9 p.s.i., said radiation barrier sheet having a thickness less than 0.2 mm., and said multi-layered composite insulation being disposed in the insulation space to provide more than 5 radiation barrier layers per inch of said composite insulation.

2. Apparatus according to claim 1 in which said fibrous sheet material is a member selected from the group consisting of rayon, cotton, Dacron, Dynel, and nylon.

3. Apparatus according to claim 1 in which said fibrous sheet material is rayon.

4. Apparatus according to claim 1 in which said fibrous sheet material is cotton.

5. Apparatus according to claim 1 in which said fibrous sheet material is rayon and said radiation barrier sheet material is aluminum foil.

6. Apparatus according to claim 1 in which said fibrous sheet material is rayon having fiber diameters less than about 15 microns.

7. Apparatus according to claim 1 in which said radiation barrier sheet material is aluminum foil of thickness less than 0.02 mm.

8. Apparatus according to claim 1 in which said fibrous sheet material is rayon having fiber diameters less than 15 microns, said radiation barrier sheet material is aluminum foil of thickness less than 0.02 mm., and more than 40 radiation barrier layers per inch of composite insulation are provided.

9. An apparatus provided with a gas evacuated insulating space continuously associated with a heat transferable container and being enclosed by rigid, self-supporting walls; a heat insulative and radiation-impervious composite flexible material comprising a multiplicity of thin, flexible, radiant heat barrier layers of thickness less than 0.2 mm. in said insulating space disposed in spaced relation to each other for reducing the transmission of radiant heat across said space, and a multiplicity of low heat conductive fibrous sheet material layers composed of fibers having diameters less than 15 microns, being coextensive with such radiation barrier layers and disposed in contiguous adjacency between and in alternating sequence with said barriers being contiguously associated with said heat transferable container for separating and supporting said barriers spaced from each other, the radiant heat barrier-low conductive fibrous sheet composite insulating material being assembled sufficiently closely to provide at least 4 fibrous sheet layers per inch of composite insulation, and disposed generally perpendicular to the direction of heat transfer across said space; and low heat conductive organic fibrous bulking material layers between at least some of the fibrous sheet layers having a total surface area contiguously associated with a minor part of the surface area of said fibrous sheet layers, adjacent bulking material layers across said insulating space being at least partially aligned with each other, said organic fibrous bulking material being composed of fibers having an intrinsic thermal conductivity of less than 0.25 B.t.u./hr. sq. ft. ° F./ft., modulus of elasticity of at least $0.35 \times 10^6$ lb./sq. in., and having diameters less than 20 microns, said bulking material being under a compressive load of 0.01 to 9 p.s.i.

10. Apparatus according to claim 9 in which said organic fibrous bulking material is a member selected from the group consisting of rayon, cotton, Dacron, Dynel, and nylon.

11. Apparatus according to claim 9 in which said organic fibrous bulking material is rayon.

12. Apparatus according to claim 9 in which said organic fibrous bulking material is cotton.

13. Apparatus according to claim 10 in which said low heat conductive fibrous sheet material is precompacted paped.

14. Apparatus according to claim 10 in which said low heat conductive fibrous sheet material is precompacted paper composed of glass fibers.

15. Apparatus according to claim 10 in which said radiant heat barrier layers are aluminum foil.

16. Apparatus according to claim 10 in which said low heat conductive fibrous sheet material is precompacted paper composed of glass fibers, and said radiant heat barrier layers are aluminum foil.

17. Apparatus according to claim 1 in which said fibrous sheet material has a modulus of elasticity of at least $1 \times 10^6$ lb./sq. in.

18. Apparatus according to claim 9 in which said fibrous sheet material has a modulus of elasticity of at least $1 \times 10^6$ lb./sq. in.

References Cited by the Examiner
UNITED STATES PATENTS

| | | | |
|---|---|---|---|
| 1,730,153 | 10/1929 | Lindsay | 220—9 |
| 1,918,335 | 7/1933 | Heylandt | 220—9 |
| 2,239,109 | 4/1941 | Lundvall. | |
| 3,007,596 | 11/1961 | Matsch | 220—9 |
| 3,009,600 | 11/1961 | Matsch | 220—9 |
| 3,009,601 | 11/1961 | Matsch | 220—9 |
| 3,059,364 | 10/1962 | Landsberg et al. | 154—44 |

THERON E. CONDON, *Primary Examiner.*

J. R. GARRETT, *Assitsnat Examiner.*